United States Patent [19]

Chadwick

[11] 4,177,020

[45] Dec. 4, 1979

[54] HEAT-POWERED WATER PUMP

[75] Inventor: Duane G. Chadwick, Logan, Utah

[73] Assignee: Utah State University Foundation, Logan, Utah

[21] Appl. No.: 891,993

[22] Filed: Mar. 31, 1978

[51] Int. Cl.² .................. F04B 17/00; F03G 7/02; F03G 7/06

[52] U.S. Cl. .................. 417/379; 60/531; 60/641; 417/395

[58] Field of Search .............. 417/570, 379, 375, 395; 60/641, 531

[56] References Cited

U.S. PATENT DOCUMENTS

| 490,526 | 1/1893 | Wheeler | 417/570 |
|---|---|---|---|
| 1,780,336 | 11/1930 | Canton | 417/394 |
| 2,212,281 | 8/1940 | Ullstrand | 62/118 |
| 2,688,923 | 9/1954 | Bonaventura et al. | 60/641 |
| 2,755,745 | 7/1956 | Lewis | 417/379 |
| 2,867,974 | 1/1959 | Wenander | 417/379 |
| 2,918,219 | 12/1959 | MacCracken | 417/379 X |
| 3,309,012 | 3/1967 | Booth et al. | 417/394 |
| 4,089,325 | 5/1978 | Brola | 60/641 X |

FOREIGN PATENT DOCUMENTS

| 635283 | 12/1927 | France | 126/271 |
| 1036504 | 9/1953 | France | 417/379 |
| 158478 | 4/1957 | Sweden | 417/379 |

Primary Examiner—Leonard E. Smith
Attorney, Agent, or Firm—J. Winslow Young; H. Ross Workman; Rick D. Nydegger

[57] ABSTRACT

A heat-powered water pump including a flash boiler and a metering device for metering a predetermined quantity of condensate to the flash boiler. A flexible pumping member is enclosed in a pumping chamber and is expanded by the vapor to force water from the pumping chamber. The flexible pumping member also serves as the heat exchange surface for transferring heat from the vapor into the water surrounding the pumping member thereby condensing the vapor. The condensate is collected in a condensate reservoir and is valved into the metering device upon collapse of the pumping member during condensation of the vapor.

12 Claims, 1 Drawing Figure

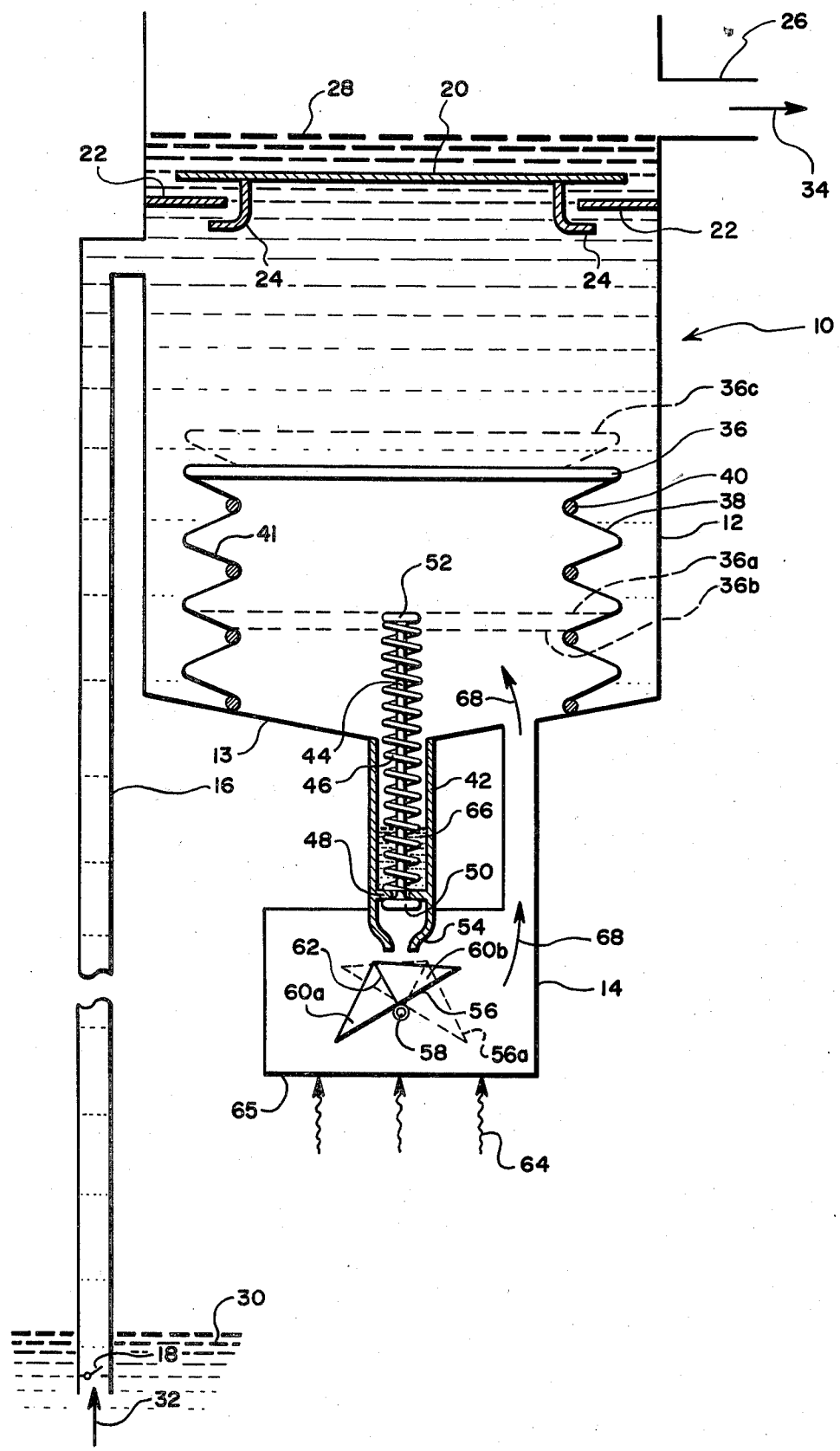

HEAT-POWERED WATER PUMP

BACKGROUND

1. Field of the Invention

This invention relates to water pumps and, more particularly, to heat-powered water pumps.

2. The Prior Art

Throughout the world there are many places where fuel and power are expensive because of limited fossil fuel deposits, transportation difficulties, extended electrical transmission lines, and the like. Even the production of electrical energy by diesel engines results in an excessive cost for electrical power when considered in light of the costs associated with the initial equipment purchase, fuel, transportation of the fuel, and repairs. In addition, projected fossil fuel shortages will result in continually increasing fuel costs.

However, cheap and abundant energy is necessary for a high material standard of living. It is only when humanity can multiply mechanical work many times beyond muscle power that enough goods and services can be produced to provide the economic conditions for a reasonably satisfactory standard of living. Although fuel and energy are reasonably available and at a relatively reasonable cost in the currently industrialized areas of the world, in the remote areas of the world the relatively high costs for fuel and energy, particularly electrical energy, substantially inhibits the further development of those portions of the world. For example, vast areas of the world are suitable for irrigation with relatively abundant sources of water being relatively readily available. However, these areas also require an economical technique for raising the water from a relatively shallow water table or nearby stream to the surface for irrigation. Most primitive devices for lifting this water include simple devices operated by one or two men or through the use of animal energy. However, animals consume food grown on irrigated land, part of which might otherwise be used for human food. Additionally, the use of manpower to pump water is particularly wasteful since man's labor can be more economically utilized in providing goods and services rather than mechanical energy.

Coincidentally, although there are many parts of the world where fuel and electrical power are expensive because of long distances from coal or oil deposits, transportation difficulties, or small-scale rather than large-scale operations, these same locations are also endowed with an abundance of available solar energy. On a comparative basis, solar energy does appear to be feasible in providing the necessary energy for the efficient pumping of water. Although solar energy is produced only while the sun is shining, pumping irrigation water, which involves no storage of power, offers a good area for the early use of solar energy. In these situations, the economic comparisons between solar energy and other energy sources appear to be sufficiently advantageous to encourage further research and development of solar energy. In addition, for those times when the sun is not shining, substitute thermal energy could be obtained from burning agricultural wastes such as stubble, chaff and the like.

Various types of water or fluid pumps operable from heat sources are shown in U.S. Pat. Nos. 2,050,391; 2,553,817; 2,688,922; 2,744,470; 2,757,618; 2,954,741; 2,973,715; 3,659,960; 3,765,799; and 3,790,305. However, the devices represented in each of the foregoing patents tend to be either complex, expensive to fabricate and maintain, or require excessive monitoring for efficient utilization in the less developed sections of the world.

In view of the foregoing, it would, therefore, be an advancement in the art to provide a heat-powered water pump which is operable to pump water from a relatively shallow location to an elevated location, the pump operating relatively independently of continuous monitoring and maintenance. In addition, it would be an advancement in the art to provide a heat-powered water pump which can utilize either solar energy or thermal energy from burning agricultural wastes. Such an invention is disclosed and claimed herein.

BRIEF SUMMARY AND OBJECTS OF THE INVENTION

The present invention relates to a heat-powered water pump especially suitable for pumping water at a remote location and from a relatively shallow location to an elevated location. The pump includes a pumping chamber with an expandable pumping member therein, a flash boiler and a condensate metering device for automatically metering a predetermined quantity of condensate to the hot surface of the flash boiler. The vapor generated by the flash boiler expands the flexible pumping member thereby displacing water from the pumping chamber. The surface of the pumping member also serves as a heat transfer surface between the hot vapor and the surrounding water in the pumping chamber to condense the vapor. The condensate collects in a condensate reservoir and is directed into the metering device by a valve operated by the pumping member. The pump is self starting and requires minimal monitoring.

It is, therefore, a primary object of this invention to provide improvements in heat-powered water pumps.

Another object of this invention is to provide improvements in the method of pumping water with a heat-powered water pump.

Another object of this invention is to provide a heat-powered water pump which is adapted to cyclically pump water from a relatively shallow location to an elevated location.

Another object of this invention is to provide a heat-powered water pump having a flash boiler and a metering device for metering a predetermined quantity to the flash boiler.

Another object of this invention is to provide a heat-powered water pump wherein a flexible pumping member also serves as a heat transfer medium for removing heat from the vapor to form condensate.

Another object of this invention is to provide a heat-powered water pump wherein the pumping member also serves to valve collected condensate into the metering device.

These and other objects and features of the present invention will become more fully apparent from the following description and appended claims taken in conjunction with the accompanying drawing.

BRIEF DESCRIPTION OF THE DRAWING

The drawing is a schematic illustration of the heat-powered water pump of this invention.

DETAILED DESCRIPTION OF THE PREFERRED EMBODIMENTS

The invention is best understood by reference to the drawing wherein like parts are designated with like numerals throughout.

With particular reference to the drawing, the heat-powered water pump of this invention is shown generally at 10 and includes a flash boiler 14, a pumping chamber 12 having a flexible pumping member 38 interposed therein. The pumping chamber also includes a diametrally enlarged, outlet check valve 20, an over flow 26 and an inlet for water 32 through inlet check valve 18 and pipe 16 in fluid communication with a body of water 30. The bottom surface of pumping chamber 12 is configured with a sloped surface 13 directed toward a condensate reservoir 42 for condensate 66.

The condensate reservoir 42 is interconnected between the pumping chamber 12, and more particularly, the interior of pumping member 38 and flash boiler 14 to provide a fluid path for condensate 66. A separate conduit provides a path for vapor 68. Condensate reservoir 42 includes a stopper 50 cooperating with a valve seat 48 to hold a body of condensate 66 therein until released as will be discussed more fully hereinafter. Stopper 50 is formed as a foot on shaft 44 and is spring-biased against valve seat 48 by a spring 46. The upper end of shaft 44 is configured as a head or plunger 52 adapted to be engaged by plate 36 of pumping member 38 as will be more fully set forth hereinafter. The lower end of condensate reservoir 42 is configured as a spout 54 to direct condensate 66 into one of the buckets 60a or 60b of a metering bucket 56.

Metering bucket 56 is mounted on a pivot 58 beneath spout 54 and above surface 65 of flash boiler 14. Metering bucket 56 is configured with two buckets 60a and 60b separated by a perpendicular septum 62 and have a generally triangular cross section with the hypotenuse portion being open to receive and discharge condensate 66. As shown, bucket 60b is under spout 54 to receive condensate 66. Upon becoming filled, the weight of condensate toward the right side of bucket 60b overbalances metering bucket 56 causing the same to tip to the position indicated by phantom lines as metering bucket 56a. At this position, condensate 66 is discharged from bucket 60b and bucket 60a is in position to receive condensate 66. The discharged condensate 66 is deposited on surface 65 of flash boiler 14.

Flash boiler 14 is particularly configured to be heated at heated surface 65 by heat, indicated schematically as heat arrows 64, by means of a conventional solar concentrator (not shown) heatpipe, or by the burning of agricultural wastes or the like. Metering bucket 56 automatically meters a predetermined quantity of condensate 66 to heated surface 65 to produce vapor 68. Vapor 68 passes upwardly through the conduit into pumping member 38.

Pumping member 38 is configured with an upper, planar head 36 fabricated from a sheet of aluminum metal or like material having sufficient rigidity to operate the valving mechanism for condensate reservoir 42 as will be set forth more fully hereinafter. The side walls 41 of pumping member 38 are fabricated as a convoluted bellows from a suitably flexible material such as an elastomer or the like. Wire ring members 40 cooperate with bellows 41 so as to suitably guide the vertical travel of pumping member 38.

Pumping member 38 is expanded from a deflated position indicated by broken lines 36b to the fully extended position indicated by broken lines 36c. The volumetric increase of pumping member 38 forces water from pumping chamber 12 upwardly through check valve 20 where the water overflows through discharge outlet 26 as discharge water 34. After expansion of pumping member 38 to position 36c, vapor 68 commences to condense by giving up thermal energy by heat exchange with the water 32 in pumping chamber 12 across planar head 36 and bellows 41. Condensate forms as condensate 66 and is collected in condensate reservoir 42.

The volume of condensate 66 in heat-powered water pump 10 is selectively predetermined so as to obtain a suitable expansion of pumping member 38 with each discharge from metering bucket 56. The continued condensation of vapor 68 results in a volumetric shrinkage of pumping member 38 to the position indicated in broken lines as 36a. Upon reaching position 36a, the upper, planar head 36 of pumping member 38 strikes head 52 on the upper end of a shaft 44. Continued downward movement of pumping member 38 to the position indicated by position 36b forces shaft 44 downwardly opening foot valve 50 away from a valve seat 48. The opening of the foot valve 50 allows condensate 66 to drain downwardly through spout 54 into metering bucket 56. Condensate 66 continues to enter metering bucket 56 until metering bucket 56 tips discharging a metered quantity of condensate 66 onto the hot surface 65 as set forth hereinbefore. The metered quantity of condensate 66 is rapidly volatilized by heat 64 absorbed by hot surface 65 to again form vapor 68. Vapor 68 again forces pumping member 38 upwardly away from head 52 allowing compression spring 46 to close foot valve 50 against valve seat 48 thereby stopping condensate 66 from entering metering bucket 56. Closure of foot valve 50 stops condensate 66 from entering flash boiler 14 resulting in a cessation of production of vapor 68. As a result, surface 65 again becomes hot from heat 64 and pumping member 38 is expanded only to position 36b which represents the predetermined operational limits for pumping member 38. In this manner, over inflation of pumping member 38 is precluded.

The diametrally enlarged check valve 20 accommodates the rapid expulsion of water 32 from pumping chamber 12 and, correspondingly, closes against valve seat 22 under atmospheric pressure pushing downwardly against water surface 28. Check valve 20 is prevented from dislodgement by guides 24 which engage the lower surface of annular valve seat 22. Closure and sealing of check valve 20 is further enhanced by the level of water 28 thereover pressing check valve 20 downwardly against annular valve seat 22. With valve 20 closed and pumping member 38 contracting from position 36c to positions 36b and 36a, a partial vacuum is created in pumping chamber 12 allowing atmospheric pressure to force water 32 upwardly through check valve 18 into pumping chamber 12.

Advantageously, the precise amount of condensate required for activation of pumping member 38 is provided by the operation of metering bucket 56. Additionally, vapor 68 is generated in flash boiler 14 only when necessary to expand pumping member 38. The expansion of pumping member 36 automatically closes the outlet from condensate reservoir 42 to preclude the inadvertent over pressurization of flash boiler 14 and pumping member 36. Additionally, condensate reservoir 42 and valving mechanism provided therein readily adapts itself for automatic operation thereby further minimizing the requirement for supervision or monitoring during the warmup and operation cycles. For example, when the heat-powered water pump 10 of this invention and, more particularly, flash boiler 14 is cold, valve 50 is open allowing condensate 66 to pass into flash boiler 14. During warmup, condensate 66 is vaporized as vapor 68 and, unless sufficient vapor pressure is available to raise pumping member 38 above position 36a, vapor 68 will continue to condense as condensate 66 and continually recycle through flash boiler 14. However, when sufficient vapor 68 has been generated to expand pumping member 38 above position 36a valve 50 will close and the cycling operation of pumping member 36 will commence. This self-starting feature is particularly advantageous for remote locations where daily supervision or startup is impractical.

The configuration of flash boiler 14 is such that a large volume of vapor 68 is generated each time metering bucket 56 deposits a predetermined quantity of condensate 66 on hot surface 65. The rapid generation of vapor 68 results in a rapid expansion of pumping member 36. Accordingly, check valve 20 is configurated with a diametrally enlarged diameter to accommodate the rapid expulsion of water 32 upwardly through check valve 20.

It is estimated that the expansion of pumping member 38 by vapor 68 will require approximately 3 seconds whereas the collapse of pumping member 38 by the condensation of vapor 68 will require about 20 seconds. This differential in expansion and contraction times is readily accommodated by the diametrally enlarged check valve 20 and the diametrally reduced check valve 18, respectively. The relatively rapid expansion of pumping member 38 means that very little time for heat transfer will occur during the pumping cycle with a resultant minimization of energy loss in thermal inertia by pumping member 38. Additionally, vapor 68 in the interior of pumping member 38 initially remains relatively hot thereby substantially eliminating thermal hysterisis of the system.

Fluids useful in the apparatus of the present invention include such fluids as, for example, cyclopentane which boils at about 50° C. Water, which boils at 100° C., can also be utilized as long as compensation is made for the higher temperatures required for the vaporization of water. Regardless of the fluid used for condensate 66 and vapor 68, care should be taken with respect to the corrosive and/or solvent effect of the vapor 68 and condensate 66 on the materials of construction of flash boiler 14, condensate reservoir 42 and, more importantly, the wall surfaces 41 of pumping member 38.

The invention may be embodied in other specific forms without departing from its spirit or essential characteristics. The described embodiment are to be considered in all respects only as illustrative and not restrictive and the scope of the invention is, therefore, indicated by the appended claims rather than by the foregoing description. All changes that come within the meaning and range of equivalency of the claims are to be embraced within their scope.

What is claimed and desired to be secured by a United States Letters Patent is:

1. A heat-powered water pump comprising:
   a pumping chamber having a diametrally enlarged outlet check valve means an an inlet means adapted to provide fluid communication with a body of water through an inlet check valve means;
   an inflatable pumping member in the pumping chamber and adapted to be inflated to displace water from the pumping chamber through the outlet check valve and deflated to create a partial vacuum in the pumping chamber to allow atmospheric pressure to force water through the inlet means, the inflatable pumping member serving as a heat exchange surface to condense vapor into condensate;
   a condensate reservoir;
   valve means for discharging condensate from the condensate reservoir;
   metering means for metering discharged condensate comprising a tipping bucket configurated with two buckets, each bucket accommodating receipt of a predetermined quantity of condensate before becoming over-balanced and discharging the metered condensate from the bucket;
   a vapor generator for vaporizing the metered condensate, and
   means for directing vapor from the vapor generator into the inflatable pumping member.

2. A method for pumping water comprising:
   enclosing an inflatable pumping member in a pumping chamber, the pumping chamber having a diametrally enlarged outlet check valve and an inlet means adapted to provide fluid communication with a body of water through an inlet check valve means;
   metering a predetermined quantity of condensate to a heated surface in a vapor generator with a metering means to produce a vapor, the metering step comprising collecting condensate in a condensate reservoir and valving condensate with a valve to a metering bucket;
   inflating the inflatable pumping member by introducing vapor from the vapor generator into the inflatable pumping member thereby displacing water from the pumping chamber through the outlet check valve;
   condensing the vapor in the inflatable pumping member by transferring heat energy across the inflatable pumping member into the water in the pumping chamber thereby collapsing the inflatable pumping member and creating a partial vacuum in the pumping chamber to allow atmospheric pressure to force water into the pumping chamber through the inlet means; and
   returning the condensate to the metering means.

3. The method defined in claim 2 wherein the valving step comprises opening the valve of the condensate reservoir by contacting the valve with the collapsing inflatable pumping member.

4. A heat-powered water pump comprising:
   a pumping chamber;
   an inflatable pumping member in the pumping chamber;
   a vapor generator comprising condensate metering means for metering condensate to a heat means, the heat means vaporizing the condensate, the condensate metering means comprising a condensate reservoir and valve means for releasing condensate from the condensate reservoir, the condensate metering means further comprising a tipping bucket configurated with two buckets, each bucket accommodating receipt of a predetermined quantity of condensate before becoming over-balanced and discharging condensate from the bucket; and means for directing vapor from the vapor generator into the pumping chamber.

5. The heat-powered water pump defined in claim 4 wherein the valve means further comprises an interconnect means operable by movement of said inflatable pumping member to open and close the valve means.

6. The heat-powered water pump defined in claim 5 wherein the interconnect means comprises a spring-biased shaft operable to be moved by said inflatable pumping member to open a valve in the condensate reservoir.

7. The heat-powered water pump defined in claim 4 wherein the pumping chamber comprises a diametrally enlarged, outlet check valve and an inlet means adapted to provide fluid communication with a water source through an inlet check valve.

8. The heat-powered water pump defined in claim 7 wherein the bottom of the pumping chamber below the inflatable pumping member is configurated as a drain to direct condensate to a predetermined location.

9. The heat-powered water pump defined in claim 4 wherein the inflatable pumping member comprises a bellows member having a generally planar head.

10. The heat-powered water pump defined in claim 9 wherein the bellows further comprises a spring member.

11. The heat-powered water pump defined in claim 4 wherein the vapor generator comprises a vessel having a vapor outlet means and a condensate inlet means and a bottom surface adapted to be exposed to a heat source.

12. The heat-powered water pump defined in claim 11 wherein the heat source is selected from the group consisting of a solar collector means and a combustion source.

* * * * *